Oct. 13, 1970    KIYOSHI INOUE    3,533,928
METHOD OF AND APPARATUS FOR THE DEBURRING OF WORKPIECES
Original Filed Dec. 1, 1966    3 Sheets-Sheet 1

KIYOSHI INOUE
INVENTOR.

BY Karl F. Ross
Attorney

Oct. 13, 1970 KIYOSHI INOUE 3,533,928
METHOD OF AND APPARATUS FOR THE DEBURRING OF WORKPIECES
Original Filed Dec. 1, 1966 3 Sheets-Sheet 3
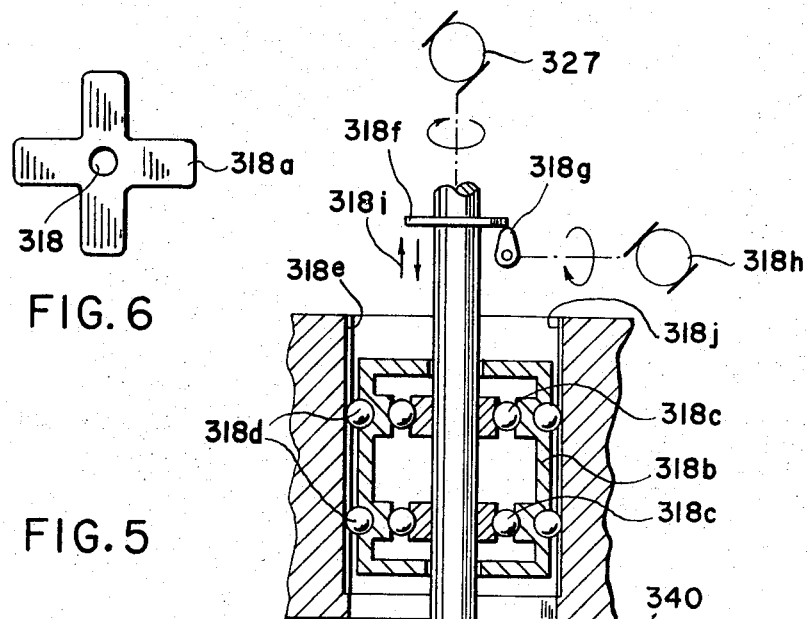
FIG. 6
FIG. 5
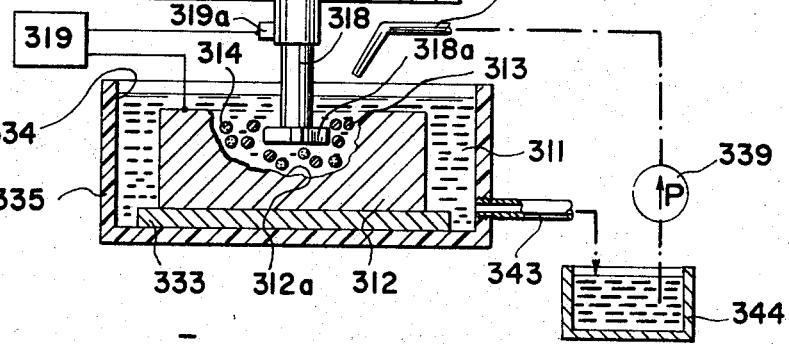
FIG. 9A
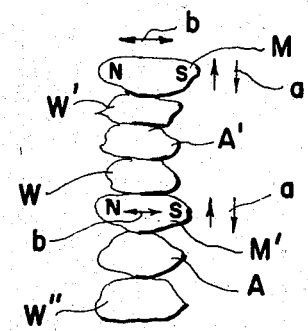
FIG. 9B
FIG. 9C
KIYOSHI INOUE
INVENTOR.
BY
Karl F. Ross
Attorney

United States Patent Office 3,533,928
Patented Oct. 13, 1970

3,533,928
METHOD OF AND APPARATUS FOR THE
DEBURRING OF WORKPIECES
Kiyoshi Inoue, 100 Sakato, Kawasaki,
Kanagawa, Tokyo, Japan
Continuation of application Ser. No. 598,391, Dec. 1,
1966. This application Apr. 21, 1969, Ser. No. 859,532
Int. Cl. B23p 1/04
U.S. Cl. 204—143                                    18 Claims

ABSTRACT OF THE DISCLOSURE

Method of and apparatus for deburring workpieces in a liquid vehicle whereby an electric current effects electrolytic removal of burrs and irregularities concurrently with mechanical and abrasive action, the liquid being an electrolyte in this case; the deburring drum contains magnetic particles increasing by magnetic attraction the force with which the workpieces are abraded or magnetizable particles energized externally of the tumbling drum to apply magnetic forces to the particles.

---

This application is a continuation of application Ser. No. 598,391, filed Dec. 1, 1966, now abandoned.

My present invention relates to a method of and an apparatus for the deburring of metallic and other conductive workpieces whereby surface irregularities of such workpieces are eliminated.

Deburring apparatus of several types are commonly in use in the metal-working field, primarily for the removal of surface irregularities in cast, machined and molded metallic workpieces. For the most part, such apparatus includes a tumbling drum provided with agitating means for repeatedly casting the workpieces, generally in a liquid vehicle and sometimes in the presence of an abrasive, into contact with one another, against the walls of the vessel or drum or into contact with other bodies (e.g. of abrasive material) mixed with the charge in the drum. This tumbling action mechanically dislodges adherent materials while rounding off irregular portions and projections integral with the metallic bodies. These systems, however, are relatively slow and even defective when the deburring operation is to remove substantial amounts of material.

It is, therefore, the principal object of the present invention to provide a method of deburring metal workpieces whereby the rate of material removal and the surface finish of the treated objects is significantly increased and improved.

Another object of this invention is to provide relatively simple and inexpensive apparatus for the high rate of deburring of metallic workpieces while yielding a relatively high quality surface finish.

Yet another object of this invention is to provide a method of and an apparatus for the deburring of relatively large-dimension workpieces of such nature that tumbling is thereof impractical.

A further object of my invention is to provide a method of and an apparatus for the high rate and efficient deburring of internal surfaces of a mold or die.

These objects and others which will become apparent hereinafter are attained, in accordance with the present invention, by a method of deburring metallic workpieces in which the liquid vehicle is agitated in contact with the workpiece to be deburred while mechanical contact between the surfaces of the latter and at least some other bodies is carried out concurrently with an electrochemical material-removal step. I have found, surprisingly, that electrochemical techniques hitherto used primarily for the electrochemical machining (ECM) and electrochemical grinding (ECG) of metallic bodies, wherein close tolerances are a necessity, can be used effectively in conjunction with a tumbling or agitating operation to deburr metallic workpieces or objects having electrolytically soluble surface portions. The surprising nature of this discovery will become all the more apparent when it is recognized that the present method does not require a stationary electrode urged against the workpiece or juxtaposed therewith via a predetermined machining gap.

In accordance with the principal feature of this invention, an electrochemical machining current, which may be direct or periodic (e.g. raw-rectified alternating current, pulsating direct current and ordinary AC) is passed through the liquid vehicle which is constituted as an electrolyte and may contain abrasive particles or merely additional bodies to facilitate mechanical deburring of the workpieces concurrently with the electrochemical action. While, in some cases, the workpiece may be stationary and connected with a pole of the electrochemical machining source, I have found that it is not necessary to connect the workpieces directly thereto, and that the mere tumbling of such workpieces in an electrolyte and in a drum having spaced-apart contact portions bridged by the electrolyte but not shortcircuited by the drum iteslf, can effect electrochemical removal of material from the workpiece surfaces.

While I do not wish to be bound by any theory in this regard and the precise reasons why the current flow through the electrolyte is effective to remove material from the surfaces of the conductive workpieces are not yet clear, it may be hypothesized that each of the workpieces acts as an electrode for the machining of others or as objects undergoing electrolytic erosion against other conductive bodies. Since electrolytic oxidation of the workpiece at its surface is essentially nonreversible in the sense that agitation and mechanical action of the electrolyte carries away the oxide film as soon as it is formed and, even upon electrical (polarity) reversal, metal is not materially redeposited from the oxide onto the machine surface, the electrolytic action is carried out as if a wire were directly connected to each workpiece.

According to a more specific feature of this invention, the agitation of a multiplicity of workpieces is effected in a tumbling drum which may be provided at its base with one electrode portion and with a second contact or electrode, at a location spaced therefrom but in contact with the electrolyte, the electrodes being connected across an AC or DC electrochemical-machining source e.g. of the type described and illustrated in any of my copending applications Ser. No. 512,338, Ser. No. 535,268, Ser. No. 562,857 (now U.S. Pat. No. 3,420,759 of Jan. 7, 1969), filed Dec. 8, 1965, and Jan. 19, 1966. The tumbling drum is, advantageously, upwardly open and rotatable about an axis tilted upwardly at an angle of, say, 30 degrees from the horizontal. In this case, the agitation is effected purely by rotation of the drum.

I have also found it to be possibe, in conjunction with such a tumbling drum, or when a stationary vessel is employed, to effect the agitation at least in part by magnetic means. Thus, if the workpieces treated in the deburring operation or the other bodies involved are magnetically permeable, I apply a magnetic field to them so as to effect their displacement in the electrolyte.

I have also found it to be advantageous to distribute in the deburring vessel among the workpieces, particles or bodies of a magnetically permeable material. Such bodies may be abrasive or electrically conductive to facilitate electrochemical erosion of the workpieces or produce the friction necessary for the deburring action. In fact, the particles or bodies serving as the agitating means need not be magnetically permeable under some circumstances, since the particles in the electrolyte tend to respond to a rapidly changing magnetic field by rotating about the axis thereof. Thus, agitation may be promoted with the aid of conductive as well as magnetically permeable particles. According to still another feature of this aspect of the invention, the particles which are magnetically or electrically displaceable in the liquid vehicle, can be coated with abrasive material, incorporated in or mixed with abrasive particles which are not influenced by an electromagnetic field.

Preference is given, in accordance with this invention, to pulsating or alternating electromagnetic fields for controlling the movement of particles and inducing electrochemical erosion of the workpiece surfaces since purely direct current has a tendency to produce agglomeration of magnetic particles in the deburring vessel.

According to another aspect of this invention, the agitation is carried out by rotating an electrode immersed in the electrolyte by, for example, rotating an electrode member in an irregular die cavity to deburr the machined surfaces thereof. Abrasive particles are here included in the deburring vehicle while an electrolytic machining current is applied between the workpiece and this rotating element. Inasmuch as this electrode member is not closely juxtaposed with the workpiece surface and is rotated relatively rapidly, a more or less uniform surfacing is effected. In accordance with this aspect of the invention, I prefer to incorporate in the vehicle a multiplicity of conductive particles which here act as intermediate electrodes and as they are dispersed by the agitation into the rotation of the die surfaces, each particle acts as an individual electrode to facilitate smoothing of the die surface. The rotary electrode member imparts a centrifugal force to the abrasive and conductive particles contained within the electrolyte so that these particles are dynamically urged outwardly and forcefully brought into contact or close juxtaposition with the surfaces to be treated to augment the resulting mechanical deburring action.

According to yet another aspect of this invention, deburring is carried out as augmented by a magnetic-field pressure which, when combined with the dynamic flow of rapidly moving particles, the centrifugal force of tumbling or electrolyte displacement by a stirrer and gravitational forces, magnetically urges the abrasive bodies against the workpieces and the workpieces against one another. This magnetic-field pressure is, advantageously, supplied by electromagnetic means disposed externally of the deburring vessel and capable of applying inward magnetic forces to the magnetically permeable particles and workpieces. When the abrasive particles or auxiliary bodies serving to facilitate mechanical removal of irregularities and projections upon the workpieces are magnetically permeable and/or the workpieces are of such permeability, a high-frequency magnetic-field applied from without, in accordance with this invention, induces an oscillation and/or a magnetostrictive expansion and contraction of the bodies so that the simple tumbling action is accompanied by a magnetic vibration or pulsation of the body to improve the erosive operation. In this connection it can also be stated that the field may be of such nature that vibration of the individual particles by the magnetic field is coupled with a tumbling action of a rotary drum or a vibration thereof to increase the mechanical abrasion.

Another feature of this invention resides in the use of chemical action in removing surface irregularities in combination with the electrochemical and mechanical deburring action as described above. Thus I have found that surprisingly effective results can be obtained when a chemical mordant or etchant for the workpiece material is incorporated in the electrolyte. For as yet unknown reasons, the surface finish and deburring rate obtained when, for example, ferric chloride is used as the chemical etchant in the electrolyte, is better than that which would be expected with either the etchant or the electrochemical action alone, while the rate of material removal exceeds the sum predictable from the individual actions of the etchant and the electrochemical erosion.

The above and other objects, features and advantages of the present invention will become more readily apparent from the following description, reference being made to the accompanying drawings in which:

FIG. 5 is an axial cross-sectional view through a system for the deburring of a die cavity;

FIG. 6 is a bottom view of the deburring tool;

FIGS. 9A–9C diagrammatically show various operating modes of the present invention.

Figure 1:
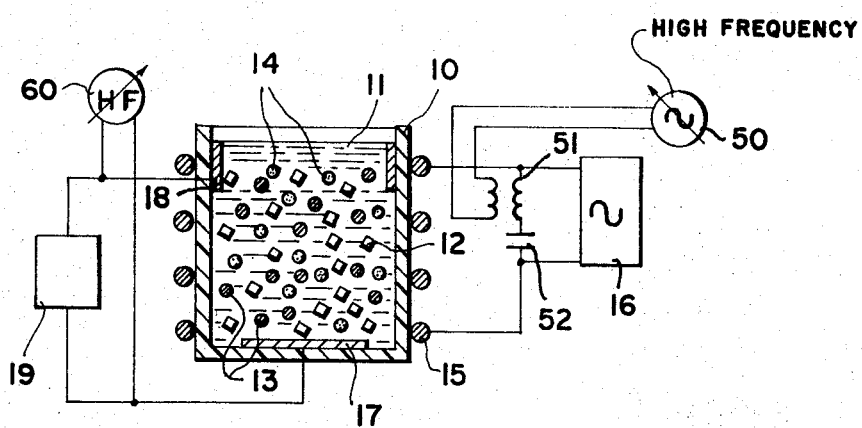
FIG. 1 is an axial cross-sectional view through a deburring vessel in accordance with the present invention, with an exaggerated showing of the particles used to treat the workpieces.

In FIG. 1 I show a deburring apparatus which comprises essentially a vessel 10 of electrically insulating and nonmagnetic material which contains a liquid deburring vehicle in the form of a dielectric or an electrolyte 11 (e.g. a 15% by weight aqueous solution of any of the electrochemical-machining solutions described in the aforementioned copending applications) in which the workpieces 12 (shown as rectangles) are distributed. The metallic workpieces 12 are accompanied, in the electrolyte, by conductive particles 13 (hatched circles) and, usually, magnetic and abrasive particles 14 (stippled circles). The vessel 10 is surrounded by a coil 15 centered on the axis of the vessel and adapted to apply an axial flux $\Phi$ to the particles within the vessel (see FIG. 2). For this purpose the coil 15 is connected to a source 16 of alternating current at high amplitude so that at least 1000 amperes turns are applied at the coil 15. Electrochemical erosion is also facilitated by a pair of electrodes 17 and 18 mounted at spaced locations within the electrolyte 11 and connected to an electrolysis current source 19.

Figure 2:
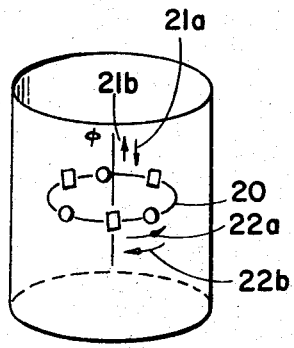
FIG. 2 is a diagram illustrating the effect of a magnetic field upon the deburring system of FIG. 1.

Dealing first with the effect of the magnetic field upon the deburring operation in the absence of electrolytic action (although it will be understood that such electrolytic action is a part of the deburring operation), it can be seen from FIG. 2 that the application of the high intensity magnetic field in axial direction induces the conductive workpieces (and even nonconductive particles) to move in a rotary path 20 about the axis $\Phi$ of the field. Since the alternating current sources 16 reverses the field as represented by arrows 21a and 21b, the rotary movement or oscillations of the particles can be represented by arrows 22a and 22b. Surprisingly enough, nonconductive particles appear to have adsorbed to the ionically charged components of the electrolyte and have some mobility under the influence of the magnetic field.

This agitation of the workpieces and graphite particles, when the latter serve as the conductive elements of the deburring system, appears to result in a greater machining speed (i.e. material-removal rate) and reduced roughness by comparison with agitation by externally applied vibrations of similar frequency and amplitude. Thus I have concluded that the application of the magnetic field in this matter may cause electric eddy currents to flow which, in view of the conductivity of the electrolyte solution, induce an electrochemical erosion in addition to the mechanical deburring action. When abrasive particles are also included, a still greater improvement is obtained.

It appears that the magnetic field produces induced electromotive forces which promote chemical action while individually oscillating the particles so that a more intimate mechanical contact between particles is available to remove surface irregularities.

To further increase the machining rate, I prefer to carry out the magnetic agitation concurrently with an electrolysis between the disk-shaped terminal 17 at the floor of the vessel 10 and the annular terminal 18 along the upper portion of the electrolyte 10. Again, even though none of the workpieces 12 need be electrically connected by conductors or the like with the source 19, electrochemical erosion is promoted by the conductive particles. This electrochemical erosion appears to be a consequence of the fact that the conductive or graphite particles act as individual electrodes such that a potential differential exists across the graphite particles and the workpiece. This differential is so poled in accordance with this invention as to insure electrochemical erosion of the workpiece with the deburring being augmented thereby.

Figure 3:
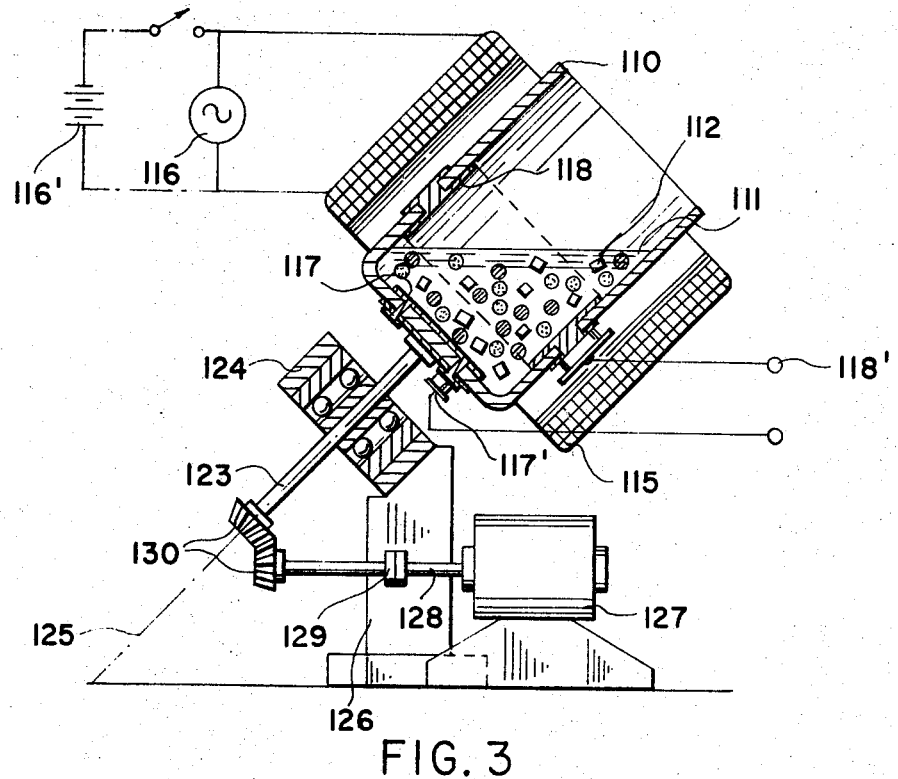
FIG. 3 is a diagrammatic cross-sectional view illustrating another apparatus embodying the principles of the present invention.

In the system of FIG. 3, the vessel 110, containing the electrolyte 111 and the workpieces 112, is mounted upon a shaft 123 and a bearing 124 such that the axis 125 of rotation of the upwardly open drum 110 is swung through an angle of about 30° with the horizontal. The bearing 124 is carried by a pedestal 126 adjacent which a motor 127 is located. The shaft 128 of this motor is connected via an overrunning clutch 129 and a bevel-gear transmission 130 with the shaft 123. Thus upon operation of the motor 127 the drum 110 is rotated about its inclined axis 125 to tumble the workpieces 112 in the electrolyte medium. Further agitation can be provided by a magnetic field coil 115 which can be supplied with alternating current from a source 116. The electromagnet coil 115 applies axial flux to the tumbling mass within the drum 110. A pair of electrodes 117 and 118 are respectively disposed along the floor of vessel 110 and the inner periphery thereof and can be connected by brushes 117' and 118' to an AC, pulsating DC or direct current source of electrolysis current not shown.

The workpieces 112, graphite particles and bodies, magnetically permeable substances such as barium ferrites and the like and an electrolyte are introduced into the drum 110 which is rotated so that gravitational force pulling the bodies downwardly through the electrolyte coacts with centrifugal forces applied to the bodies to produce mechanical contacts between the bodies and the rubbing of irregular portions to smooth same. Concurrently, an electrochemical-erosion current may be supplied between the terminal 117 and 118 so that the graphite particles constitute electrochemical-dissolution electrodes. The alternating current field applied at 116 to the coil 115 produces vibrations and oscillations of the particles which further augment the deburring action (see the accompanying examples).

While a direct current source (116') can be connected across the coil 115 if a constant magnetic field is desired, the rapid rotary entrainment of the magnetic particles and conductive workpieces 112 will result in an induced electric current flow in the deburring mass which has been found to have an electro-chemical erosion effect.

In fact, comparison with prior art methods of simple tumbling without use of the magnetic fields and electrochemical system demonstrates that the time required for deburring can be decreased on the order of ten to a hundredfold.

Abrasive particles are included in the deburring vessel alone or in combination with conductive and magnetic particles. Thus the present invention contemplates that abrasive particles such as silicon carbide and aluminum oxide may be sintered together with barium ferrite magnetic particles or graphite conductive particles so that the same particles can constitute the abrasive component and the magnetic or conductive bodies. In fact, when the particles are permanently magnetic, as is the case with barium ferrite bodies, the inherent fields of these particles are sufficient to cause them to draw against the workpieces with magnetic forces which, upon agitation of the particles under the influence of externally applied AC magnetic fields or agitation of the vehicle or by tumbling of the system promote erosion of the workpieces. In this case, a magnetic force field component urges the particles of abrasive against the workpieces together and cooperates with a centrifugal and gravitational force component.

Figure 4:
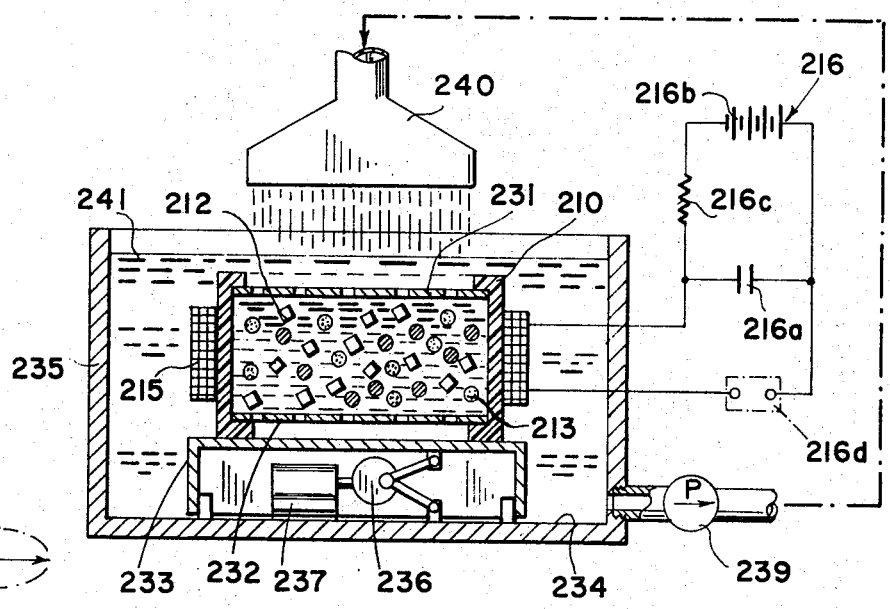
FIG. 4 is an axial cross-sectional view of a deburring system using magnetic agitation.

FIG. 4 shows another arrangement for applying the principles of the present invention, the vessel 210 being here shown as an electrically nonconductive tube whose inwardly extending flanges at the opposite ends of the tube 210 carry perforated end plates 231 and 232. The vessel 210 is disposed upon a pedestal 233 which may be resiliently suspended upon the bottom 34 of a surrounding container 235 so that this pedestal may be vibrated by any conventional vibrating means, e.g., an eccentric 236 driven by a motor 237. The oscillations of the pedestal 233 may be orbital so as to have a vertical component and a horizontal component as represented at 238. A high rate of electrolyte flow is conducted through the vessel 210 by means of a pump 239 which circulates electrolyte to a sprayhead 240 which overlies the level 241 of electrolyte in the receptacle 235.

The cylindrical sleeve 210 is surrounded by an energizing magnet 215 connected to a pulsation source 216 which includes a discharge capacitor 216a which is chargeable from a battery 216b via a resistor 216C. A sparkgap 216d is connected in series with the capacitor 216a across the coil 215. Thus the capacitor 216a will charge at a rate determined by the time constant of the RC network 216a, 216c until the potential across the gap 216a reaches the breakdown potential thereof. A discharge will then appear at this gap, resulting in a mometnary and highamplitude current flow through the coil 14 as the capacitor 216a discharges through the coil and the gap. Upon draining of the capacitor 216a charging begins again at a repetition rate which is a function of the time constant of the RC network. The vessel 210 contains workpieces 212 in addition to abrasive particles 213, preferably of tungsten carbide, titanium carbide, tetraboron carbide, aluminum oxide, and silicon carbide, or mixtures thereof. The vibrations imparted to the vessel 210 cause relative movement of the abrasive and workpiece bodies within the electrolyte and there appears to be some electrochemical action resulting from such vibration in conjunction with the application of a magnetic field via the coil 215. Since the discharge through this coil has a relatively steep wavefront, the particles are driven together more or less impulsively and results demonstrate that such impulsive operation promotes the deburring operation by comparison with the application of an ordinary sinusoidal alternating current field.

In FIG. 5 I show a modified deburring system of particular value for the removal of irregularities from a die cavity and for the finishing of machined or cast surfaces of large objects which cannot be readily tumbled. In the system of FIG. 5, a workpiece 312, such as a die, having a cavity 312a, is deburred by mechanical, electrochemical and chemical action as will be apparent hereinafter. The workpiece 312 is mounted upon a support plate 333, which may be vibrated in the manner described with reference to the plate form of FIG. 4 in order to facilitate mechanical agitation, within an electrolyte vessel 335. Electrolyte is continuously supplied to the vessel 335 via a nozzle 340 which is connected with a pump 339 drawing electrolyte from a reservoir 344. An outlet 343 from the vessel 335 delivers electrolyte to the reservoir 344 so that sediment is collected in this reservoir upon the decanting of the electrolyte by the pump 339. Thus electrolyte is continuously supplied to the die cavity 312a from which it overflows into the chamber 334 of vessel 335.

Within this die cavity 312a, an electrode 319 is rotated by a motor 327 about its vertical axis. The head 318a of this electrode is provided with radial arms and is of cruciform or star configuration as illustrated in FIG. 6. The agitating head 318a is spaced from the surfaces of the cavity and centrifugally propels the electrolyte 311 against the surfaces thereof while promoting electrochemical erosion. For this purpose, an electrochemical machining source 319, which may be of any of the types illustrated and described in the aforementioned copending applications, is connected to the relatively stationary workpiece 312 and, via a pump 319a, to the rotating electrode 318.

In accordance with the principles of the present invention, the mold cavity 312a also contains conductive particles 313 of graphite and, if desired, abrasive particles 314. The latter may be magnetic in whole or in part if a magnetic field having a flux parallel to the electrode 318 is applied. The particles 314 can be a metal carbide, silicon carbide, boron nitride, aluminum oxide or the like.

The centrifugal force and momentum imparted to these particles by the rotating electrode 318 casts them against the irregular surface of the cavity 312a and permits them to mechanically dislodge and remove any irregularities which may be loosenable or abradable in this manner. Concurrently, electrochemical action between the particles 314 and the workpiece also is effective to electrolytically dissolve burrs and like prominences along the surface. It will be immediately apparent that the electrochemical action is concentrated upon the burrlike projections from such surfaces because of the proximity of the projections to the electrode and the higher current density at these prominences. As a consequence, the deburring action is not only carried out at a faster rate but more smoothly and is capable of yielding a surface of a better finish than has been possible heretofore.

Augmented agitation is provided by axially vibrating the electrode 318 concurrently with its rotation. For this purpose, the electrode 318 is rotatably mounted in a bearing sleeve 318b by ball bearings 318c which prevent relative axial displacement of the electrode 318 and the sleeve 318b while permitting the electrode to rotate freely within this sleeve. The nonrotating sleeve 318b is guided via rollers 318d in grooves 318e parallel to the electrode 318 so that the sleeve moves freely only in the vertical direction. The electrode 318 carries a follower flange 318f supported upon a rotary eccentric cam 318g which is driven at a high rate by a motor 318h. Thus the electrode 318 is reciprocated in vertical direction (arrows 318i) during the deburring operation. The support 318g for this electrode can be fixed or shiftable in two mutually perpendicular directions in the horizontal plate so as to facilitate positioning of the head 318a properly in the die cavity 312a. It will be understood that a similar apparatus can be used to deburr a large exposed surface of the body 312 with the rotating electrode being then juxtaposed with this surface and the graphite and/or abrasive particles filling the entire vessel rather than merely the die cavity.

Figure 7:
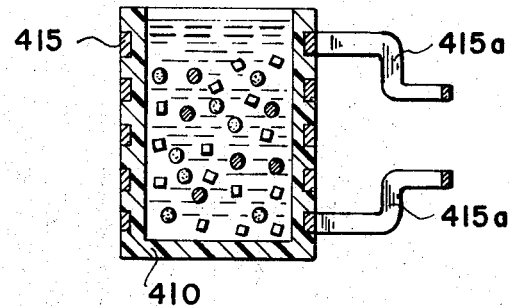
FIG. 7 is a cross-sectional view through another system embodying the principles of this invention.

In FIG. 7, I show a modified deburring system which does not use external forces to supply the agitation necessary. Here, the nonmagnetic and electrically insulating vessel 410 is cylindrical and has a coil 415 imbedded in the wall of this vessel. The vessel may be glass or synthetic resin while the coil 415, whose leads 415a can be connected to a source such as that shown at 16 in FIG. 1, are generally flattened and are constituted as bus bars so as to enable them to carry high electric curents. The vessel 410 can be generally flattened (e.g. of pillbox configuration), elongated as illustrated here or even spheroidal. In addition to the workpieces, the vessel 410 contains magnetic, conductive and abrasive particles not otherwise identified. In practice, the system functions as described with reference to FIGS. 1 and 2 and may be provided with the electrodes 17 and 18 thereof.

Figure 8:
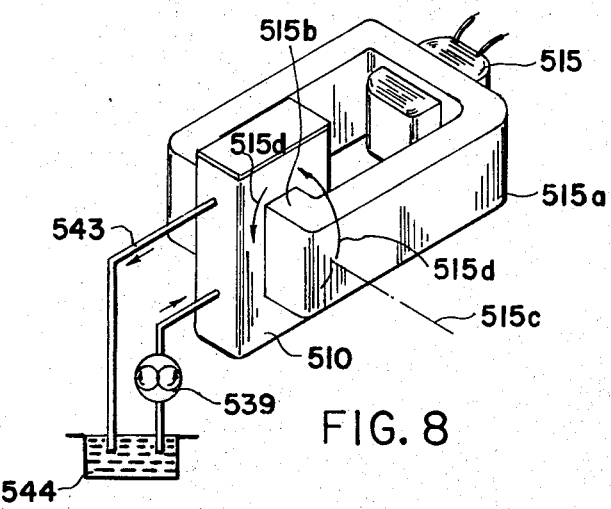
FIG. 8 is a perspective view of a system using any current agitation of the workpieces.

A circulation of particles and workpieces in the electrolyte may be carried out with the aid of an apparatus as illustrated in FIG. 8. Here, the vessel 510 is generally prismatic and is supplied continuously with electrolyte by a pump 539 from reservoir 544, the returning flow of electrolyte being delivered by the line 543 to the reservoir. A magnetic yoke 515a has its poles 515b flush with the lateral walls of the vessel 510 and surrounded by the coil 515. When a high-amplitude alternating-current flux (e.g. upwards of about 2000 ampere turns) is applied to the coil 515, the force field between the poles 515b along axis 515c induces an eddy current flow as represented by arrows 515d about this axis promotes mechanical action while polarizing the conductive particles within the vessel and permitting them to act as individual electrode bodies with respect to an electrochemical erosion of the workpiece surfaces.

The various operative modes of the present invention are set forth below in connection with FIGS. 9A–9C. Prior to reviewing these modes, however, it is to be noted that the magnets 15, 115, 215, 415 and 515 may also be energized by a high-frequency AC source in addition to a low-frequency vibrating or oscillating source. The high-frequency source, preferably operating at 400 kilocycles to 50 kilocycles per second and well above sonic frequencies appears to reduce the barrier toward electrochemical action at the face of the workpiece so that the electrochemical portion of the erosion and deburring action is augmented. The low-frequency vibrating source can operate at, say 30–400 c.p.s. so that the particles oscillate about respective centers or spatially within the vehicle at a corresponding frequency. When magnetostrictive particles are employed, the high-frequency magnetic field expands and contracts them along at least one crystalline axis so that an additional frictional movement is available to promote deburring. While only a simplified high-frequency source is illustrated in FIG. 1, it will be understood that a similar system can be used for the energizing circuit of the magnets in each of the other embodiments. The high-frequency source of FIG. 1 includes a high-frequency alternating current generator 50 which is connected across the primary of a coupling transformer 51 whose secondary winding lies in series with a DC blocking capacitor 52 across the electromagnet coil 15. The high-frequency source 50 may be any conventional variable frequency oscillator and need not have a sinusoidal output. In fact a stepped or sawtoth output appears to be as effective. Furthermore the electrochemical-machining source 19, which may be DC, pulsating DC or AC as described earlier, may include a high-frequency depolarizing source connected across the electrodes 17, 18. This latter source should have a frequency ranging from kilocycles to several megacycles and is represented by the high-frequency generator 60 which is connected across the electrodes 17 and 18.

In FIG. 9A, I represent diagrammatically the relationship between the various particles and bodies present in the electrolyte vehicle in accordance with, for example, the system of FIG. 1. If the electrodes 17 and 18 are represented at 617 and 618 of FIG. 9A the workpieces 612 will be disposed at random in the electrolyte 611. The electrolyte here is preferably an aqueous solution of a potassium or sodium salt and may be any of the electrochemical machining solutions set forth in my copending applications mentioned above. Best results are obtained with sodium or potassium nitrate, sodium or potassium nitrite, sodium or potassium acetate, sodium or potassium chloride and the like. The solution may also include, however, a chemical etching agent such as ferric chloride or sodium or potassium hydroxide. In fact, acids and bases of different types may be included as etchants for this purpose. Within the vehicles, graphite particles 613 are dispersed with, possibly, a lesser number of abrasive particles 614. It has been observed that, in the system of FIG. 9A, each of the graphite particles 613 acts as a pseudo-electrode and that electrochemical action takes place at sites E along both surfaces of the workpiece. Similarly, electrochemical action is effected at E' only between graphite particles as well as between a graphite particle and one of the electrodes 617 and 618. The mechanical agitation of the system effects an abrasive contact between the particles 614 and the workpiece 612 as well. Thus the system of FIG.

9A can be considered to deburr the workpiece by a chemical etching action, by mechanical removal of irregularities (i.e. abrasion, impact, etc.) and by electrolytic dissolution of prominences.

In FIG. 9B, the mechanical action is promoted by a field perpendicular to the plane of the paper axis 715c so that the workpieces 712, the abrasive particles 714 and the graphite particles 713 move in a circular path about this axis and, when the particles are magnetically permeable, are urged into contact with another with magnetic forces which augment the mere random contact discussed earlier.

In FIG. 9C, I show an idealized system wherein applying the principles of FIG. 1, magnetic particles M and M' are vibrated in the direction of arrows $a$ by an alternating magnetic field so that they alternately apply force to the workpieces W, W' and W" transversely to their contact faces or to abrasive portions A and A'. Consequently, mechanical movement or agitation of the system will result in abrasive deburring of the workpieces with a frictional force augmented by the magnetic field. When, however, the magnetic field is of high-frequency type and magnetostrictive particles are used, the particles M and M' undergo expansion and contraction in the direction of arrows $b$ so that this movement is superimposed upon the mechanical agitation and further increases the rate of deburring. The magnetic particles M and M' may, of course, also be abrasive or conductive in which case the electrochemical action described with respect to FIG. 9A also operates here. The magnetic particles may be ferrites or sintered permanent magnetic materials although I have found it to be advantageous to use as a binder for the magnetic grains making up these particles an elastomeric material so that the particles themselves are highly elastic. Thus the inherent expansion and contraction of such particles acts in the manner of the magnetostrictive expansion and contraction to promote removal of irregularities from the workpiece surfaces.

EXAMPLE I 10 kg. of cast-iron workpieces of cylindrical configuration (disks, pins or studs) having a diameter of 30 mm. and a length of 10 mm. was deburred in a rotary tumbling drum having an axis inclined 30° above the horizontal and driven at 55 r.p.m. (FIG. 3). The drum has a diameter of 300 mm. and an axial length of 700 mm. and was provided with electrodes bridged by the electrolyte as illustrated at 117 and 118. 5 liters of an aqueous electrolyte containing 10% by weight potassium nitrate, 5% by weight sodium carbonate and 2% by weight sodium nitrate was used. The additive bodies or particles consisted of 5 kg. of graphite in the initial test with equal parts of cylindrical particles having a diameter of 5 mm. and a length of 2 mm. 18 volts AC was applied across the electrodes at 80 amp. For corresponding treatment times, this system gave a burr-removal speed of 24 grams per hour and 18 grams per hour with roughnesses of 1 and 0.6 micron $H_{max}$, respectively, whereas the corresponding machining speeds and roughnesses were 0.010 gram per hour and 0.008 gram per hour at 8 and 2 microns $H_{max}$, respectively, when 20 kg. of alumina abrasive was used in accordance with standard methods in a similar drum.

EXAMPLE II

Using the system of FIG. 1, deburring was carried out in a 15% sodium chloride solution upon a mass of 35% by volume of steel workpieces having a diameter of 10 mm. and a length of 5 mm. Graphite particles as described in Example I were used in a ratio to the workpiece quantity of about 1.15:1 and a 50 cycle alternating current was delivered to the coil 15 at 1800 amp. turns. The average deburring speed was about 127 mg. per hour as compared with 5-15 mg. per hour for abrasive particles (alumina) in accordance with conventional systems. The average roughness was about 6 microns $H_{max}$ as compared with 17 microns $H_{max}$ for the conventional system. When one part by weight of barium ferrite magnetic particles was added to the vehicle containing graphite particles in a ratio of one part by weight of barium ferrite to nine parts by volume graphite (the barium ferrite particles being rectangular bodies of 5 x 5 x 2 mm.), the average deburring speed was increased to 140 mg. per hour without increase in roughness.

EXAMPLE III

The apparatus illustrated basically in FIG. 4 was used with barium ferrite, permanently magnetic particles (5 kg.) having an average diameter of 3 mm. and a length of 3 mm. The abrasive component here was constituted by 1 kg. of 300 mesh $B_4C$. The workpieces were cast iron pellets of cylindrical configuration having a diameter of 10 mm. and a length of 10 mm. The magnetic field was applied by a coil 215 of fifty turns and the energizing current was a 50 cycles/sec. at 60 amp. The workpieces, prior to insertion in the vehicle, had a roughness of 200 microns $H_{max}$. The liquid vehicle was kerosene. When the magnetic field was applied, a 15-minute run without mechanical agitation resulted in a deburring such that the workpieces had a roughness of 10-15 microns $H_{max}$. When the magnetic field was omitted, agitation for one hour at 50 cycles/sec. reduced the roughness to 10-15 microns $H_{max}$. Such agitation via the platform, when coupled with a permanent-magnet field (3000 amp. turns) reduced the roughness to latter level in 20-30 minutes. Thus the permanently magnetic field also was deemed to apply an additional force facilitating deburring action. Using the same composition of the (permanent-magnet) deburring mass with the apparatus of FIG. 3, it was possible to reduce the time required to yield a roughness of 10-15 microns $H_{max}$ to 10 minutes when the drum was rotated at 50 r.p.m. about its axis at 30° to the horizontal. The time in such cases was further reduced by the application of a DC field as set forth in Example I concurrently with the magnetic field. When no external magnetic field whatever was applied, the permanent-magnet forces (as shown by the foregoing data) nevertheless decreased the time for deburring to a roughness of 10-15 microns $H_{max}$ by comparison with a system in which the permanent-magnet particles were replaced by an equivalent quantity of equivalent size abrasive particles.

EXAMPLE IV

The apparatus of FIG. 8 was provided with a 100-liter rubber-lined plastic case serving as the deburring vehicle. The electrolyte-circulation means maintained this vehicle 80% full (80 liters total volume). The volume was occupied 20% by the rubber-permanent magnetic bodies all of which had a diameter of 3 mm. and in the form of disks (⅓ by volume), balls (⅓) and needles of a length of 5 mm. (⅓). 35% by volume of the contents of the case was made up of cast iron needles of a diameter of 5 mm. and a length of 15 mm. whereas another 25% by volume was 50-mesh aluminum oxide. The balance of the volume was made up by a 5% potassium nitrate solution and the deburring mass also contained 10 grams of 100-mesh kaoline. The magnetic field was a self-circulating system to which 50 cycles/sec. alternating current at 160 va. was applied (1 turn). When the magnetic field was in an off state, no machining or deburring was observed. When the current was turned on and a field produced, an erosion rate of 160 grams per hour was observed.

When the solution contained 5% by weight ferric chloride and the current flow was 200 va. through the energizing magnet, an induced E.M.F. of 14 volts was detected. The erosion rate was then 260 grams per hour.

The abrasive particles were replaced by graphite bonded to equal parts of aluminum oxide, silicon oxide and magnesium oxide by sintering at the usual temperatures (e.g. in the range of 1600° C.). Other suitable abrasive particles for the purposes of any of the foregoing examples were found to be tungsten carbide, titanium carbide and silicon carbide.

EXAMPLE V

Deburring of nonconductive workpieces

Using the deburring drum of FIG. 4, nonconductive particles of ruby, constituting the workpieces, are agitated with barium-ferrite permanently magnetic particles. The drum contains 3 kg. of barium-ferrite particles having an average diameter of 3 mm. and an average length of 3 mm. 2 kg. of the ruby particles are treated, the rubies initially being approximately cubic with sides of about 1 mm. The liquid vehicle is kerosene; the polishing operation is carried out with 400–500 amperes supplied to a two-turn coil surrounding the vessel (FIG. 4) at about 50 cycles/second. The ruby particles thus polished for a period of about 1 hour are found to have a spherical configuration, a bright or shiny texture and diameters ranging between 0.8 and 0.9 mm. When mechanical vibration (e.g. via the motor 237 and eccentric 236) is used, the rate of machining to the finished particle size stated is increased.

The invention described and illustrated is believed to admit of many modifications within the ability of persons skilled in the art, all such modifications being considered within the spirit and scope of the appended claims.

I claim:

1. A method of deburring one or more metallic workpieces which comprises the steps of:
   passing an electric current through an agitated liquid electrolyte;
   dynamically and randomly casting said one or more workpieces about in said electrolyte during the passage of said electric current therethrough to erode electrolytically at least projecting portions of a workpiece surface while mechanically smoothing same; and
   randomly distributing in said electrolyte conductive, granular particles of a material different from that of said one or more workpieces for continuous dynamic movement in the electrolyte whereby particles spaced from a workpiece across a gap spanned by electrolyte constitute electrode elements against which projecting portions of a workpiece surface are electrochemically eroded.

2. The method defined in claim 1 wherein said particles are composed at least in part of graphite.

3. The method defined in claim 1 wherein said particles are composed at least in part of a material capable of abrading said surface.

4. The method defined in claim 1 wherein said particles are at least temporarily magnetizable, said method further comprising the step of magnetically urging said particles against said surface.

5. The method defined in claim 4 wherein said particles are urged against said surface by externally applying a magnetic field to the system consisting of said workpiece, said electrolyte and said particles.

6. The method defined in claim 5 wherein said magnetic field is alternating.

7. The method defined in claim 1 wherein a multiplicity of such workpieces are tumbled in a rotating drum in contact with the electrolyte and said particles.

8. The method defined in claim 1 wherein said electrolyte contains magnetic particles and is agitated by an externally applied fluctuating magnetic field.

9. A method of deburring a workpiece which comprises the steps of:
   agitating a liquid electrolyte in the region of a surface of the workpiece to be deburred in the presence of at least some electrically conductive and some at least temporarily magnetizable particles of a material other than said workpiece;
   concurrently passing an electric current through said electrolyte to erode electrolytically at least projecting portions of said surface while mechanically smoothing same; and
   magnetically urging said temporarily magnetizable particles against said surface.

10. The method defined in claim 9 wherein said particles are urged against said surface by externally applying a magnetic field to the system consisting of said workpiece, said electrolyte and said particles.

11. The method defined in claim 10 wherein said magnetic field is alternating.

12. A method of deburring a metallic workpiece, comprising the steps of:
    agitating a liquid vehicle in the region of the surface of said workpiece to be deburred and in the presence of particles at least some of which are capable of abrading said surface;
    magnetically applying said particles against said surface during the agitation of said vehicle relative thereto; and
    electro-chemically eroding portions of said surface concurrently with the magnetic application of said particles against said surface.

13. The method defined in claim 12 wherein said particles are at least in part permanently magnetic.

14. The method defined in claim 13 wherein said particles are inherently resiliently compressible and elastically deformable.

15. The method defined in claim 14 wherein the particles in said liquid vehicle consist in part of magnetic bodies and in part of abrasive bodies, said abrasive bodies being selected from the group which consists of tungsten carbide, titanium carbide, boron carbide, silicon carbide, aluminum oxide, silica and magnesium oxide.

16. The method defined in claim 15 wherein said particles are urged against said surface by a continuous externally applied magnetic field of said vehicle.

17. The method defined in claim 15 wherein said particles are urged against said surface by a periodically externally applied magnetic field.

18. The method defined in claim 15 further comprising the step of applying a high-frequency field to said magnetic particles concurrently with urging them against said surface.

References Cited

UNITED STATES PATENTS

| | | | |
|---|---|---|---|
| 3,272,729 | 9/1966 | Jumer | 204—140.5 |
| 3,061,708 | 10/1962 | Pfav | 219—69 |
| 2,994,165 | 8/1961 | Brevik | 51—164 |
| 2,965,556 | 12/1960 | Damgaard | 204—140.5 |
| 2,923,100 | 2/1957 | Simsian | 51—7 |
| 2,796,702 | 2/1955 | Bodine | 51—7 |
| 1,658,872 | 2/1928 | Yeager | 204—309 |

FOREIGN PATENTS

| | | |
|---|---|---|
| 137,894 | 1/1960 | U.S.S.R. |
| 17,651 | 1/1929 | Great Britain. |

JOHN H. MACK, Primary Examiner

S. S. KANTER, Assistant Examiner

U.S. Cl. X.R.

204—213, 224

UNITED STATES PATENT OFFICE
CERTIFICATE OF CORRECTION

Patent No. 3,533,928    Dated 13 October 1970

Inventor(s) Kiyoshi INOUE

It is certified that error appears in the above-identified patent and that said Letters Patent are hereby corrected as shown below:

In the heading insert :

-- Claims priority applications Japan 40-81678 filed 29 December 1965, 41-4173 filed 24 January 1966, 41-37215 filed 9 June 1966, 41-38722 filed 15 June 1966 and 41-46276 filed 15 July 1966. --

Signed and sealed this 6th day of April 1971.

(SEAL)
Attest:

EDWARD M. FLETCHER, JR.
Attesting Officer

WILLIAM E. SCHUYLER, JR.
Commissioner of Patents